July 9, 1940.  M. A. TIRABASSO  2,207,421
HYDRAULIC BRAKE SHOE
Filed April 1, 1939  2 Sheets-Sheet 2
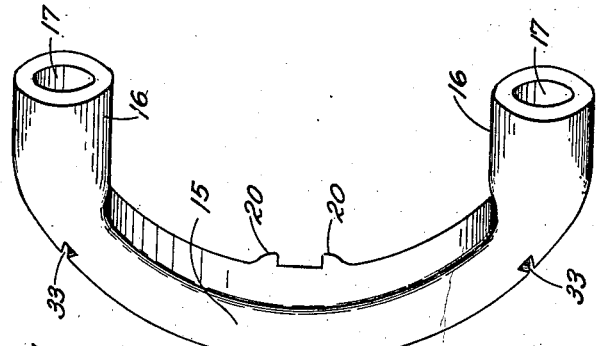
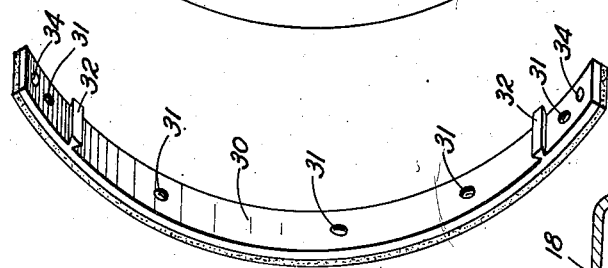
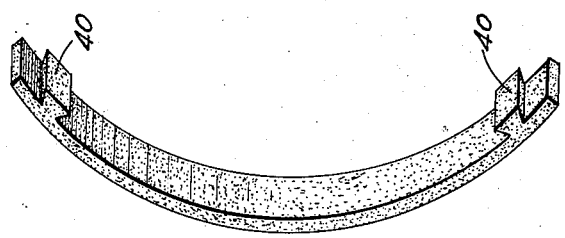
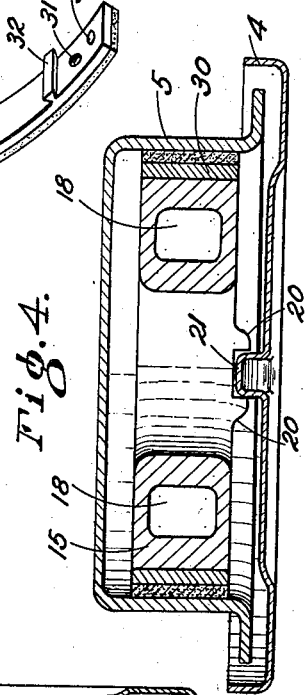
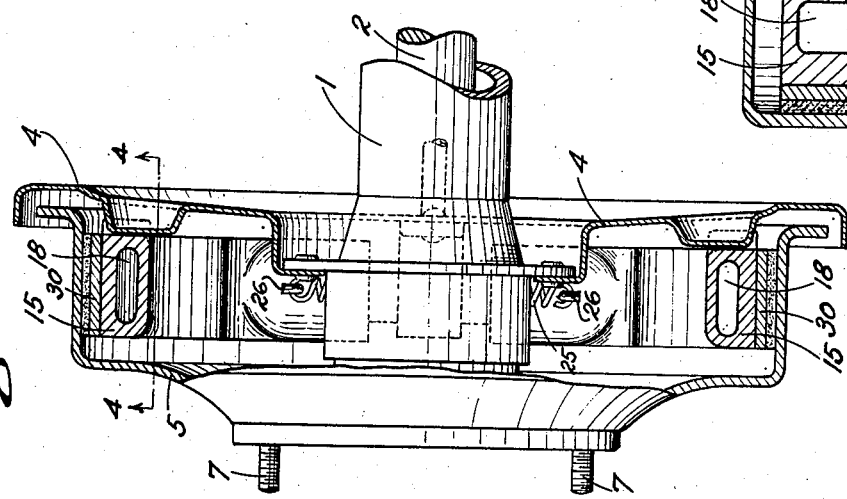
INVENTOR.
Michial A. Tirabasso.
BY
Richey & Watts
ATTORNEYS.

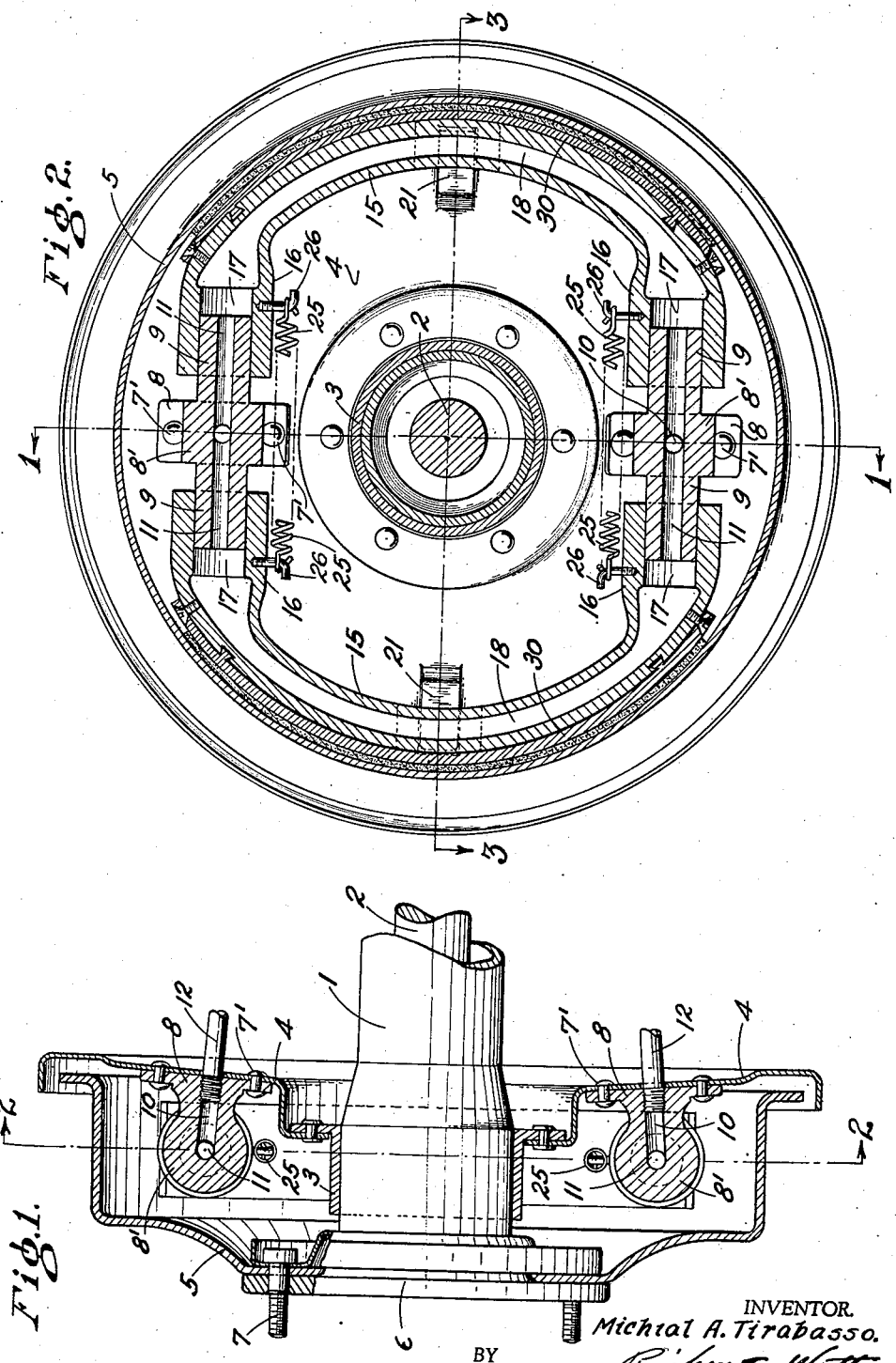

Patented July 9, 1940

2,207,421

UNITED STATES PATENT OFFICE 2,207,421

HYDRAULIC BRAKE SHOE

Michial A. Tirabasso, Cleveland, Ohio

Application April 1, 1939, Serial No. 265,503

4 Claims. (Cl. 188—152)

This invention relates to improvements in fluid brake system such as are used on automobiles, and more particularly to brakes of the so-called internal expanding type.

One of the objects of this invention is to provide a brake mechanism wherein the parts, disposed inside of the brake drum, need no external lubrication other than is isupplied by the fluid of the system.

Another object of the invention is to provide an internal brake mechanism wherein there are no links or pivots to become clogged and inoperative from dirt or rust.

Another object of the invention is to provide a brake mechanism wherein the braking pressure exerted by the shoes against the brake drums is equally distributed.

Another object of the invention is to provide a braking system where the pressure exerted by the shoes is equalized within the shoes themselves.

Another object of the invention is to provide a brake mechanism wherein a greater area of braking surface may be used and where the brakes have no tendency to be self-locking.

Another object of the invention includes the arrangement and organization of parts whereby greater simplicity and economies in manufacture are exercised and whereby the number of working parts are reduced to a minimum.

Still other objects of the invention and the invention itself will become more apparent from the following description of an embodiment thereof which description is illustrated by the accompanying drawings and forms a part of this specification.

In the drawings:

Fig. 1 is a vertical medial section taken through the center of a brake drum and showing the device of my invention, being taken along the line 1—1 of Fig. 2;

Fig. 2 is a section taken at 90° to that of Fig. 1 along the lines 2—2 of Fig. 1;

Fig. 3 is a section similar to that of Fig. 1 taken along the lines 3—3 of Fig. 2;

Fig. 4 is a section taken along the lines 4—4 of Fig. 3;

Fig. 5 is a perspective view of one of the brake shoes of my invention;

Fig. 6 is a perspective view of a quick detachable brake lining support; and

Fig. 7 is a view of a modified form of brake lining adapted to be used in my invention.

Referring now to the drawings, throughout which like parts have been designated by like reference characters, as best shown in Figs. 1 and 3, the end 1 of a differential housing is shown with the axle 2 extending therethrough. The housing supports an annular bracket 3 which in turn supports a brake supporting shield 4, the shield being riveted to the bracket.

The end of the axle 2 carries a brake drum 5 which is secured to the flange 6, the flange being provided with the usual studs 7 for supporting a wheel, not shown.

The edge of the brake supporting shield is formed, as best illustrated in Figs. 1 and 3, with a circumferential flange which cooperates with the brake drum to prevent the ingress of dirt and water.

A pair of anchor members are provided, as best shown in Figs. 1 and 2, each comprising a base 8 secured to the supporting shield by rivets 7'. Each anchor member has a body 8 which extends into the brake drum. The body of each anchor member is provided with a pair of laterally extending arms or pistons 9 which provide a support and operating connection to the brake shoes hereinafter described. The pistons are preferably cylindrical and those on the upper anchor member are in parallelism with those of the lower anchor member. There are preferably two of these anchor members for each wheel or brake, they being disposed in diametrically opposite relation on opposite sides of the wheel axle. These supports are shown in vertically aligned relation, the better to eliminate the effects of gravity upon the brake shoes, but they may be disposed in places other than that shown, if desired.

Fluid ducts are provided in the anchor members extending from the base as at 10 and laterally as at 11 through the extremities of the pistons 9, and connection to the ducts may be made externally by the tubes 12 which extend through openings in the brake shield and are threaded into the ducts.

The brake shoes, which are supported on said anchor members, each comprises a semi-circular body 15, the ends of which terminate in parallel aligned cylindrical members 16. The members 16 are provided with bores or cylinders 17 fitted to and reciprocable on the pistons 9. The body 15 of the brake shoe is formed with a duct 18 therethrough, which communicates with the cylinder 17. Suitable packing means, not shown, such as rings or the like, may be provided to prevent fluid leakage between the pistons 9 and cylinders 17.

Each of the shoes is provided with a pair of lugs 20 on the side adjacent the shield 4 at the center adapted to straddle a guide boss 21, the guide bosses are diametrically oppositely disposed and are adapted to guide and absorb torque applied to the shoes.

Means for holding the shoes normally adjacent to the anchor members is provided and comprises tension springs 25 hooked over hooks 26 on the shoes. The hooks 26 are shown as separate screws threaded into the cylinders of the shoes, but obviously hooks might be and probably would preferably be formed integral with the shoes.

A friction brake surface is provided for each shoe and is preferably provided by an arcuate metal strip 30 upon which the brake lining is secured by rivets 31. The strip is also provided with dovetails 32 on its inner surface which are aligned with and adapted to be slid into the grooves 33 formed in the curved face of the shoe. The lining and support are slid as a unit into cooperative engagement with the shoe. Lateral movement of the lining may be eliminated by passing screws which extend through the end holes 34 in the lining support and are threaded into the brake shoe. In event that the screws are used, tongue and groove members could be substituted.

Another form of lining which requires no support, is shown in Fig. 7 and comprises a pressed lining of stiff material, of which there are many well known makes. The underside of the lining is provided with integral dovetails 40 adapted to fit in corresponding grooves in the shoe. With this type of lining no rivets are necessary and if omitted, prevent the usual recovering of the brake drum when the lining wears.

In practice, the conduits 12 are connected to each other by a T coupling, thus making it necessary to have only one main conduit extending to each wheel brake. Each of the main conduits is in turn connected to the main source of pressure by means of which fluid is forced into the lines. The springs 25 normally hold the shoes with the cylinders 16 telescoped to their fullest extent on the pistons 9. In this position the end of the cylinders 16 may contact with the bodies 8 of the anchors.

When pressure is applied to the fluid in the system, it enters through the tubes 12 into the ducts 10 of the anchor members and thence by the branches 11 through the piston into the cylinders. It should be understood, of course, that the lines and passages 12, 10, 11 and 15 are filled with the fluid. This increase in pressure causes the cylinders to be moved outward on the pistons against the pressure of the springs 25, carrying with them the shoe 15 and forcing the lining of the shoe into frictional contact is therefore equally distributed, each shoe exerting the same amount of pressure.

When fluid pressure is relieved, the springs 25 return the shoes to their normal unexpanded position where the lining is free from contact with the brake drums.

The brake shoes and lining illustrated in the drawing may obviously be increased in area by extending the circular portion of the shoe to embrace the cylinder 16. The shoes are preferably equal in area which is a departure from the regular practice. Any tendency to a self-energizing action of the shoes is prevented, since such action is immediately transmitted by the fluid connection between the shoes to the other shoe, thus equalizing the pressure.

Although I have shown and described the invention as being particularly adapted to automotive vehicles, it is also obvious that the same may be used in other places where friction brakes may be desired and I do not desire to limit my invention in its use to automotive vehicles.

It will thus be seen that I have provided a brake mechanism that has a minimum number of working parts and where the usual linkages that are liable to rust and become inoperative from the dirt or lack of lubrication, are eliminated.

Having thus described my invention in an embodiment thereof, I am aware that numerous and extensive departures may be made therefrom by those versed in the art, but that it is not my intention that the invention be restricted other than is defined in the appended claims.

I claim:

1. A fluid braking mechanism of the class described including a wheel brake shield, anchor members carried by said shield and provided with oppositely extending brake shoe supports, said supports being formed to provide fluid ducts therethrough, hollow brake shoes slidably journalled on said supports, the hollow interiors of said shoes being in communication with the ducts of said supports, said shoes adapted to be movable on said supports away from each other upon the admission of fluid pressure to said ducts.

2. A fluid braking mechanism of the class described including a wheel brake shield, a pair of anchor members carried by said shield in spaced relation to each other, and each provided with oppositely extending brake shoe supports, said members being formed to provide fluid ducts therethrough, hollow brake shoes slidably journalled on said supports, the hollow interiors of said shoes being in communication with the ducts of said supports, said shoes adapted to be movable away from each other on said supports upon the admission of fluid pressure to said ducts, and spring means connecting the shoes to each other and adapted to normally urge the shoes toward each other on the anchor members.

3. In combination with a wheel brake drum, a brake including a brake supporting shield, anchor members carried by the shield, each comprising a base adapted to be attached to the shield and having a body extending into said drum, a pair of oppositely extending cylindrical members on said body, said body being formed with a fluid duct adapted to be connected to a source of fluid pressure, said duct having branches extending through the ends of said cylinder members, a pair of shoes having a lining thereon and adapted for engagement with the interior of said brake drums, said shoes being provided at the ends with cylinders adapted to be seated and slidable on said cylindrical members, said shoes being provided with communicating ducts extending between said cylinders and adapted upon admission of fluid pressure into said anchor members to move said brake shoes on said anchor members in opposite direction in engagement with said brake drums.

4. In combination with a wheel brake drum, a brake mechanism therefor including a brake supporting shield disposed adjacent the drum, anchor members carried by the shield on opposite sides of the wheel axle and each comprising a base adapted to be attached to the shield and having a body extending from the shield into said drum, a pair of oppositely extending cylindrical members on said body, said body being formed with a fluid duct adapted to be connected to a source of fluid pressure, said duct having branches extending through the ends of said cylinder members, a pair of shoes having a lining thereon and adapted for engagement with the interior of said brake drums, said shoes being provided at the ends with cylinders adapted to be seated and slidable on said cylindrical members of said anchors, said shoes being provided with communicating ducts extending between said cylinders and adapted upon admission of fluid pressure into said anchor members to move said brake shoes on said anchor members in opposite direction into engagement with said brake drums, and spring means connecting the adjacent ends of said shoes to each other normally urging said shoes toward each other, co-operating guides on the shoes and shield to maintain relative alignment of the shoes.

MICHIAL A. TIRABASSO.